United States Patent [19]
Ogawa

[11] Patent Number: 4,910,623
[45] Date of Patent: Mar. 20, 1990

[54] MAGNETIC TAPE CASSETTE
[75] Inventor: Masazumi Ogawa, Kanagawa, Japan
[73] Assignee: Fuji Photo Film Co., Ltd., Kanagawa, Japan
[21] Appl. No.: 249,063
[22] Filed: Sep. 22, 1988
[30] Foreign Application Priority Data
Sep. 22, 1987 [JP] Japan .......................... 62-145066[U]
[51] Int. Cl.⁴ ............................................ G11B 23/02
[52] U.S. Cl. ................................................... 360/132
[58] Field of Search ................. 360/132, 130.21, 130.2
[56] References Cited
U.S. PATENT DOCUMENTS
4,365,277 12/1982 Namiki .......................... 360/130.21
4,674,000 6/1987 Lee ...................................... 360/132

Primary Examiner—John H. Wolff
Attorney, Agent, or Firm—Sughrue, Mion, Zinn, Macpeak & Seas

[57] ABSTRACT

In a magnetic tape cassette, a magnetic tape is accommodated in a casing formed of an upper half and a lower half and is run along a path between a supply reel and a take-up reel. The path has an S-shaped portion defined by a pair of guide members near the take-up reel. The lower casing half has no wall portion standing in the direction of thickness of the cassette within a predetermined distance from a line which is perpendicular to the line joining the centers of the guide members defining the S-shaped portion of the tape running path and intersects the line substantially at the middle between the centers.

2 Claims, 4 Drawing Sheets

MAGNETIC TAPE CASSETTE

BACKGROUND OF THE INVENTION

1. Field of the Invention

This invention relates to a magnetic tape cassette.

2. Description of the Prior Art

As shown in FIG. 3, in a magnetic tape cassette 1, a magnetic tape 3 wound around a reel 2 is run along a predetermined path under the guidance of guide members and the like and taken up around a take-up reel 4 during recording or reproduction.

Generally the tape running path is complicated in order to improve running stability of the tape 3 and to apply a proper tension to the tape 3. For example, the tape 3 is run along an S-shaped path near the take-up reel 4 under the guidance of a guide roller 5 and guide pin 6 mounted on the lower cassette half 7 to be taken up around the take-up reel 4 in a predetermined tension.

When assembling such a magnetic tape cassette 1, the tape 3 must be inserted into such a complicated tape running path. The tape insertion is generally effected in the following way. The reels 2 and 4 are held in a relative position conforming to the relative position in the lower cassette half 7, and the tape 3 is drawn out and held in a shape conforming to the running path in the cassette by a plurality of forming pins. In this state, the reels 2 and 4 and the tape 3 are lowered and incorporated in the lower casing half 7 which opens upward.

In the tape insertion, insertion of the tape 3 into the S-shaped part of the running path defined by said guide roller 5 and the guide pin 6 can be disturbed by a wall portion 7b of the lower casing half 7 surrounding a locating hole 7a near the S-shaped part, particularly a projection 7c of the wall portion 7b projecting toward the S-shaped part which can interfere with the forming pins or the tape. In order successfully to insert the tape 3 into the S-shaped part of the tape running path without interference of the wall portion 7b or the projection 7c with the tape or the forming pins, there have been made various contrivances on the shape of the forming pins, position of the same and the like.

In one of the contrivances, a pair of forming pins 8 and 9 which are positioned as shown in FIG. 4 relative to the guide roller 5 and the guide pin 6 are used. The forming pin 9 has an arcuate cross-section extending along the peripheral surface of the guide pin 6. With this arrangement, the tape 3 is made to extend arcuately along the peripheral surface of the guide pin 6, whereby interference of the tape 3 with the projection 7c is prevented.

In another of the contrivances, a small diameter forming pin 9a is used as shown in FIG. 5 in place of the arcuate forming pin 9 shown in FIG. 4. The small diameter forming pin 9a is placed between the guide members 5 and 6 and the projection 7c to bend the tape 3 at the forming pin 9a, thereby preventing interference of the tape 3 with the projection 7c when inserting the tape 3 between the guide members 5 and 6.

However, these forming pins 9 and 9a are disadvantageous in that they are very low in strength, and accordingly, they are apt to be bent by accident during adjustment of the tape insertion system and can be readily deformed by light external force.

Further, since the tape 3 is wrapped around the forming pin 9 or 9a after the forming pin 8, the level at which the tape 3 is wound around the forming pin 9 or 9a is apt to be affected by the verticality of the forming pin 8 and can be vertically deviated from the correct level defined by the flange surface of the take-up reel 4. When the level of the tape 3 is deviated downward, the lower edge portion of the tape 3 can project downward from the lower end of the forming pin 9 or 9a, and the tape 3 can be damaged by the lower end of the forming pin upon application of tape tension. This may be avoided by elongating the forming pin. However, in the arrangement shown in FIG. 4 or 5, the length of the forming pin is limited since the forming pin is moved toward the lower casing half 7 when incorporating the reels 2 and 4 and the tape 3 into the casing half 7, and cannot be sufficiently long to prevent damage on the tape 3.

The problems described above may be overcome by the use of a forming pin 9b having a larger diameter and a larger length and by arranging the forming pin 9b to move up and down with respect to the lower casing half 7 outside the lower casing half 7 as shown in FIG. 6. However, since the tape 3 must be drawn outside the lower casing half 7 in this case, the tape 3 must be arranged to extend at an angle counterclockwise (as seen in FIG. 6) to the direction perpendicular to the line joining the centers of the guide members 5 and 6 in order to avoid interference with the projection 7c. This gives rise to another problem that the forming pin 8 must be positioned nearer to the guide member 5 and accordingly must be small in diameter, which weakens the forming pin 8. Further, even if the problem of the strength of the forming pin 8 may be overcome, the tape 3 runs close to the projection 7c and the guide members 5 and 6 and accordingly fluctuation in positioning of the tape by the tape insertion system or fluctuation in dimensions of the lower casing half 7 can cause interference of the tape 3 with the projection 7c, or the guide member 5 or 6.

There has been a lower casing half 7' having a wall portion 7'b provided with no projection as shown in FIG. 7. In this case, by positioning forming pins 8' and 9' so that the tape 3 extends therebetween in perpendicular to the line joining the centers of the guide members 5 and 6 and by positioning the forming pin 9' inside the lower casing half 7', the problem of interference of the tape 3 with the guide member 5 or 6 or the wall portion 7'b can be solved. However, the problem of the length of the forming pin 9' still remains. When intending to solve the problem of the length of the forming pin 9' by positioning the forming pin 9' outside the lower casing half 7' as shown by the chain line in FIG. 7, the problem of interference of the tape 3 with the wall portion 7'b again arises. Further, if the tape 3 is counterclockwise inclined in order to prevent interference of the tape 3 with the wall portion 7'b, the problem of the diameter of the forming pin 8' or interference of the tape 3 with the guide member 5 or 6 arises.

SUMMARY OF THE INVENTION

In view of the foregoing observations and description, the primary object of the present invention is to provide a magnetic tape cassette which can solve the problems described above.

The magnetic tape cassette in accordance with the present invention is characterized in that the lower casing half has no wall portion standing in the direction of thickness of the cassette within a predetermined distance from a line which is perpendicular to the line joining the centers of the guide members defining the S-shaped portion of the tape running path and intersects the line substantially at the middle between the centers.

DESCRIPTION OF THE PREFERRED EMBODIMENT

Since the magnetic tape cassette in accordance with the present invention is characterized by the structure of the lower casing half, description will be made mainly on the structure of the lower casing half of two embodiments of the present invention with reference to FIGS. 1 and 2, hereinbelow.

Figure 1:
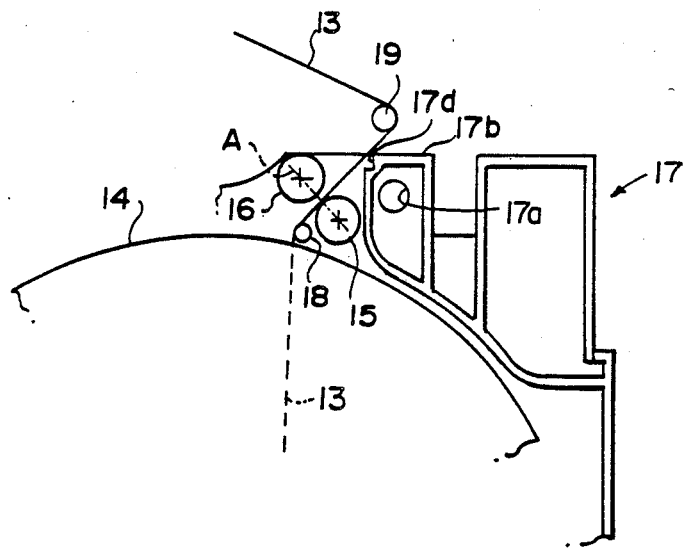
FIG. 1 fragmentary plan view showing a part of a magnetic tape cassette in accordance with an embodiment of the present invention.
Figure 3:
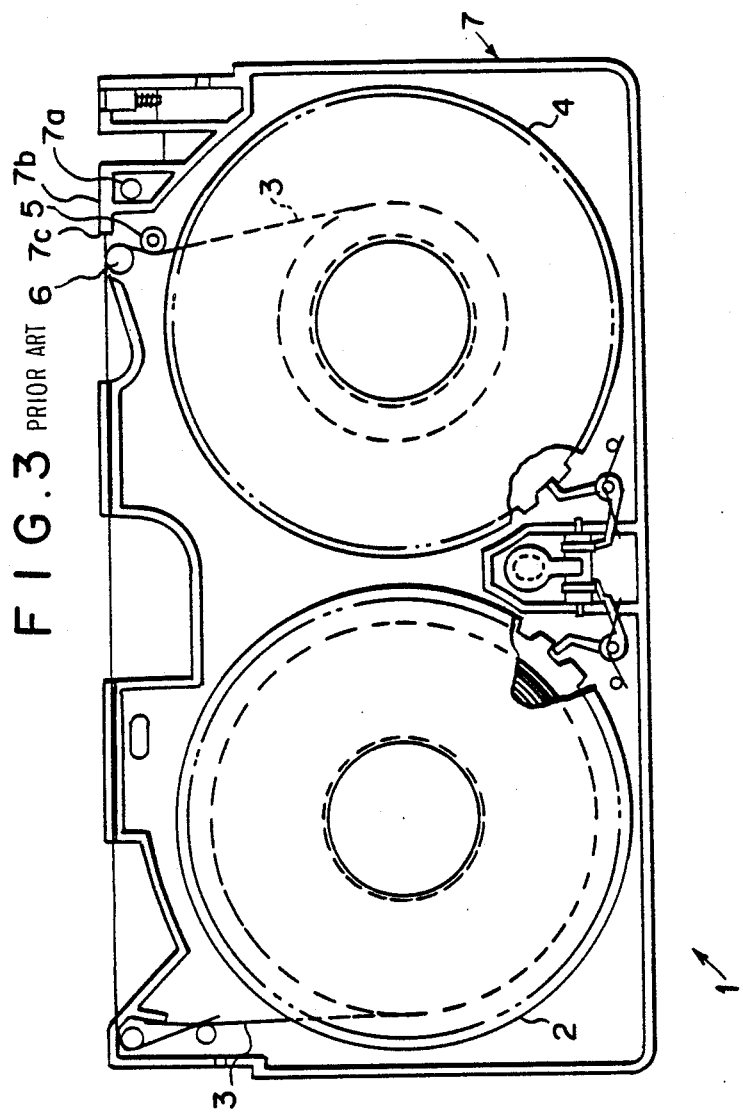
FIG. 3 is a plan view of a conventional magnetic tape cassette with the upper casing half removed.
Figure 4:
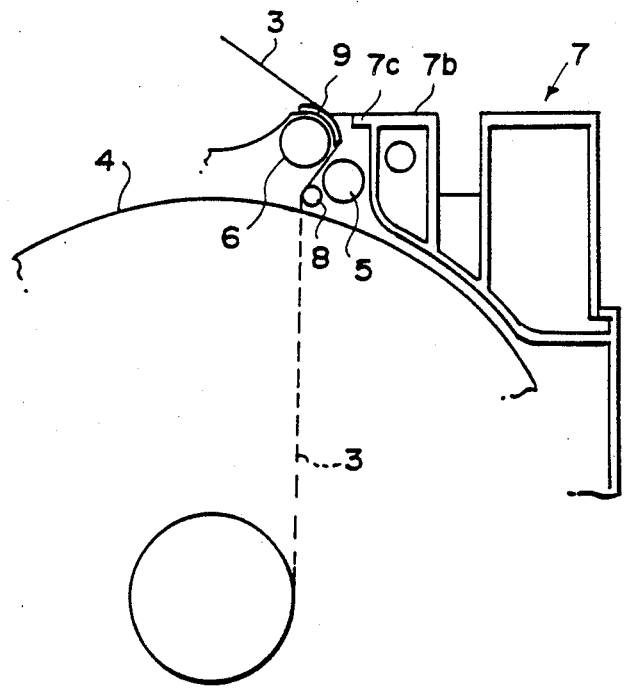
FIG. 4 is a fragmentary plan view showing a contrivance on insertion of the tape into the S-shaped path.
Figure 5:
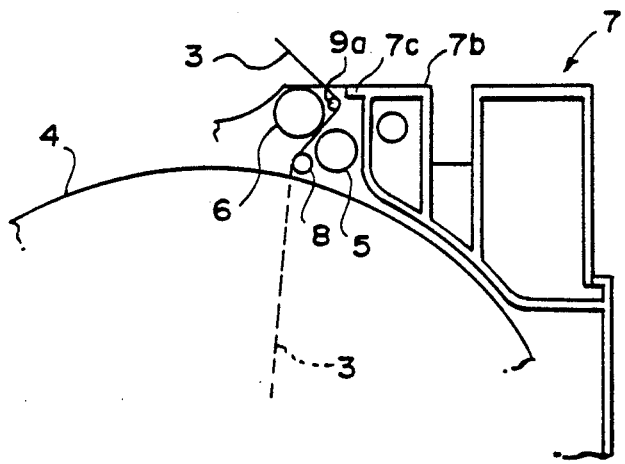
FIG. 5 is a view similar to FIG. 4 but showing another contrivance on insertion of the tape into the S-shaped path.
Figure 6:
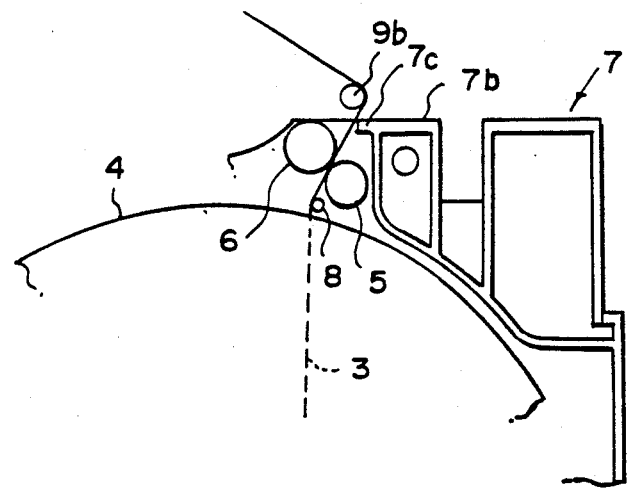
FIG. 6 is a view similar to FIG. 4 but showing still another contrivance on insertion of the tape into the S-shaped path.
Figure 7:
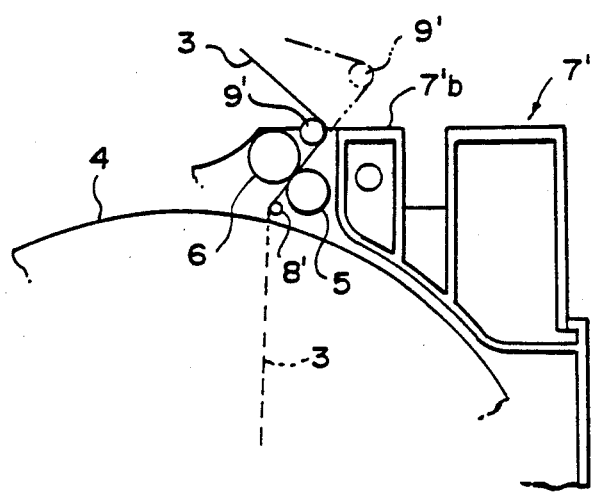
FIG. 7 is a view similar to FIG. 4 but showing a contrivance on insertion of the tape into the S-shaped path in another conventional magnetic tape cassette.

In FIG. 1, in accordance with an embodiment of the present invention, the lower casing half 17 is provided with a pair of guide members, i.e., a guide roller 15 and a guide pin 16, which defines one of an S-shaped tape running path and an inverted S-shaped tape running path near a take-up reel 14 like the conventional lower casing half shown in FIG. 3. The lower casing half 17 has a wall portion 17b surrounding a locating hole 17a near the S-shaped tape running path. The lower casing half 17 is characterized in that the wall portion 17b is provided with a cutaway portion 17d so that the wall portion 17b is spaced, at any portion thereof, from a tape-insertion line which intersects the center line A joining the centers of the guide members 15 and 16 and which is perpendicular to the line A substantially at the middle or midpoint between the centers.

Figure 2:
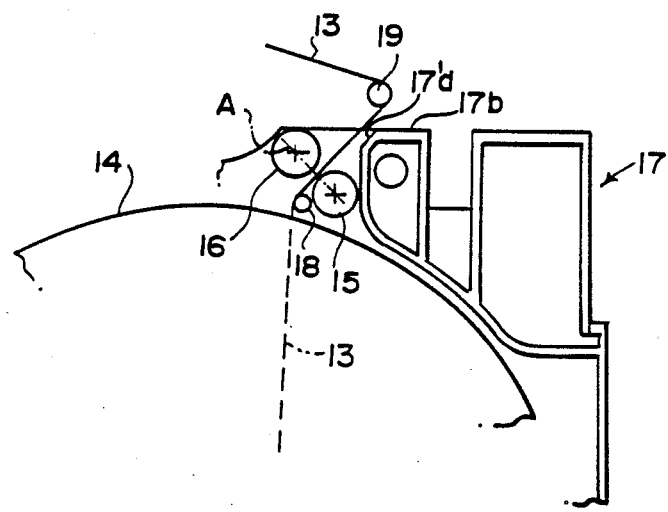
FIG. 2 is a view similar to FIG. 1 but showing another embodiment of the present invention.

In another embodiment of the present invention shown in FIG. 2, the wall portion 17b is chamfered at a corner to form a surface 17'd parallel to the line A so that the wall portion 17b is spaced, at any portion thereof, from a tape insertion line which intersects the center line A joining the centers of the guide members 15 and 16 which is perpendicular thereto substantially at the middle or midpoint between the centers.

In both the embodiments shown in FIGS. 1 and 2, even if the forming pins 18 and 19 are arranged so that the tape 13 intersects the line A in perpendicular thereto at the middle between the centers of the guide members 15 and 16 and the forming pin 19 is outside the lower casing half 17, sufficient space can be ensured between the tape 13 and the wall portion 17, the guide member 15 or the guide member 16, whereby interference of the tape 13 with the wall portion 17, or the guide members 15 and 16 during insertion of the tape 13 can be prevented. Since the forming pin 19 can be positioned outside the lower casing half 17, the forming pin 19 may be sufficiently large in length. Further, the arrangement permits the forming pins 18 and 19 to be sufficiently large in diameter.

I claim:

1. In a magnetic tape cassette in which a magnetic tape is accommodated in a casing formed of an upper casing half and a lower casing half and is run along a path between a supply reel and a take-up reel, and in which said lower casing half contains a wall portion surrounding a locating hole useable for positioning said cassette, said path having one of an S-shaped portion and an inverted S-shaped portion defined by a pair of guide members near said wall portion and said take-up reel, the improvement wherein:

said lower casing half having no wall portion standing within a predetermined distance from a preselected tape-insertion line which is defined as being perpendicular to a center line joining centers of said pair of guide members and which intersects said center line substantially at a midpoint between the centers, such that said magnetic tape can be inserted into said cassette along said predetermined tape-insertion line during manufacture without a danger of said magnetic tape contacting said wall portion.

2. In a magnetic tape cassette in which a magnetic tape is accommodated in a casing formed of an upper casing half and a lower casing half and is run along a path between a supply reel and a take-up reel, and in which said lower casing half contains a wall portion surrounding a locating hole useable for positioning said cassette, said path having one of an S-shaped portion and an inverted S-shaped portion defined by a pair of guide members near said wall portion and said take-up reel, the improvement wherein:

said lower casing half having said wall portion spaced by a predetermined distance from a predetermined tape-insertion line along which said magnetic tape is inserted during manufacture, wherein said perpendicular tape-insertion line is defined as being perpendicular to a center line joining centers of said pair of guide members, such that said magnetic tape can be inserted into said cassette during manufacture without a danger of said magnetic tape contacting said wall portion.

* * * * *